(12) United States Patent
Kahu et al.

(10) Patent No.: US 12,273,523 B2
(45) Date of Patent: Apr. 8, 2025

(54) SYSTEMS AND METHODS FOR JOINT SIGNALING OF TRANSFORM COEFFICIENT SIGNS

(71) Applicant: Tencent America LLC, Palo Alto, CA (US)

(72) Inventors: Samruddhi Yashwant Kahu, Palo Alto, CA (US); Madhu Peringassery Krishnan, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 34 days.

(21) Appl. No.: 18/143,516

(22) Filed: May 4, 2023

(65) Prior Publication Data

US 2023/0412812 A1 Dec. 21, 2023

Related U.S. Application Data

(60) Provisional application No. 63/352,411, filed on Jun. 15, 2022.

(51) Int. Cl.
*H04N 19/00* (2014.01)
*H04N 19/13* (2014.01)
*H04N 19/176* (2014.01)
*H04N 19/18* (2014.01)
*H04N 19/91* (2014.01)

(52) U.S. Cl.
CPC ........... *H04N 19/13* (2014.11); *H04N 19/176* (2014.11); *H04N 19/18* (2014.11); *H04N 19/91* (2014.11)

(58) Field of Classification Search
CPC ...... H04N 19/13; H04N 19/176; H04N 19/18; H04N 19/91; H04N 19/463; H04N 19/12; H04N 19/70
See application file for complete search history.

(56) References Cited

U.S. PATENT DOCUMENTS

| 5,790,839 A | * | 8/1998 | Luk | G11C 5/025 |
| | | | | 713/300 |
| 5,901,304 A | * | 5/1999 | Hwang | G11C 7/22 |
| | | | | 365/230.06 |

(Continued)

OTHER PUBLICATIONS

Benjamin Bross et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, 139 pgs.

(Continued)

*Primary Examiner* — Frank F Huang
(74) *Attorney, Agent, or Firm* — Morgan, Lewis & Bockius LLP

(57) ABSTRACT

The various embodiments described herein include methods and systems for encoding and decoding video. In one aspect, a method includes obtaining video data that includes a first block. The method further includes determining a plurality of transform coefficients associated with the first block. The method also includes predicting respective coefficient signs for the plurality of transform coefficients. The method also includes entropy coding the first block including jointly signaling two or more of the predicted coefficient signs.

20 Claims, 7 Drawing Sheets

(56) References Cited

U.S. PATENT DOCUMENTS

| | | | | |
|---|---|---|---|---|
| 6,072,834 A * | 6/2000 | Kim | ............. | H04N 19/176 382/250 |
| 6,097,756 A * | 8/2000 | Han | ............. | H04N 19/537 375/240 |
| 6,580,754 B1 * | 6/2003 | Wan | ............. | H04N 19/33 375/E7.079 |
| 6,728,317 B1 * | 4/2004 | Demos | ............. | H04N 19/55 348/E7.015 |
| 6,765,962 B1 * | 7/2004 | Lee | ............. | H04N 19/124 375/240.03 |
| 6,771,703 B1 * | 8/2004 | Oguz | ............. | H04N 19/59 375/240.03 |
| 6,826,232 B2 * | 11/2004 | Chen | ............. | H04N 19/14 375/240.18 |
| 7,016,412 B1 * | 3/2006 | van Zon | ............. | H04N 19/156 375/240.1 |
| 7,095,782 B1 * | 8/2006 | Cohen | ............. | H04N 21/2404 375/E7.02 |
| 7,245,662 B2 * | 7/2007 | Piche | ............. | H04N 19/46 382/250 |
| 7,263,124 B2 * | 8/2007 | Peng | ............. | H04N 19/34 375/240.03 |
| 7,369,610 B2 * | 5/2008 | Xu | ............. | H04N 21/234327 375/E7.091 |
| 7,391,807 B2 * | 6/2008 | Lin | ............. | H04N 19/124 375/240.03 |
| 7,477,688 B1 * | 1/2009 | Zhang | ............. | H04N 19/40 375/240 |
| 7,627,034 B2 * | 12/2009 | Park | ............. | H04N 19/46 375/240.08 |
| 7,697,608 B2 * | 4/2010 | Lee | ............. | H04N 19/14 375/240.03 |
| 7,729,421 B2 * | 6/2010 | Campisano | ............. | H04N 19/577 375/240.01 |
| 8,040,952 B2 * | 10/2011 | Park | ............. | H04N 21/4347 375/240.01 |
| 8,189,659 B2 * | 5/2012 | Han | ............. | H04N 21/43637 375/240.02 |
| 8,494,042 B2 * | 7/2013 | Park | ............. | H04N 19/513 375/240 |
| 2007/0064791 A1 * | 3/2007 | Okada | ............. | H04N 19/63 375/E7.125 |
| 2007/0223582 A1 | 9/2007 | Borer | | |
| 2009/0028245 A1 * | 1/2009 | Vieron | ............. | H04N 19/109 375/E7.123 |
| 2011/0243231 A1 * | 10/2011 | Li | ............. | H04N 19/433 375/E7.256 |
| 2011/0268175 A1 * | 11/2011 | Tan | ............. | H04N 19/895 375/E7.026 |
| 2013/0028324 A1 * | 1/2013 | Chang | ............. | H04N 19/433 375/E7.125 |
| 2014/0092970 A1 * | 4/2014 | Misra | ............. | H04N 19/52 375/240.16 |
| 2014/0362922 A1 | 12/2014 | Puri et al. | | |
| 2018/0176556 A1 | 6/2018 | Zhao et al. | | |
| 2018/0176563 A1 | 6/2018 | Zhao et al. | | |
| 2022/0353547 A1 | 11/2022 | Peringassery Krishnan et al. | | |
| 2023/0136599 A1 * | 5/2023 | He | ............. | H04N 19/159 375/240.02 |

OTHER PUBLICATIONS

Peter de Rivaz et al., "AV1 Bitstream & Decoding Process Specification", The Alliance for Open Media, Jan. 8, 2019, 681 pgs.

Yue Chen et al., "An Overview of Core Coding Tools in the AV1 Video Codec", 5 pgs.

Tencent Technology, ISRWO, PCT/US2023/021218, Aug. 4, 2023, 16 pgs.

* cited by examiner

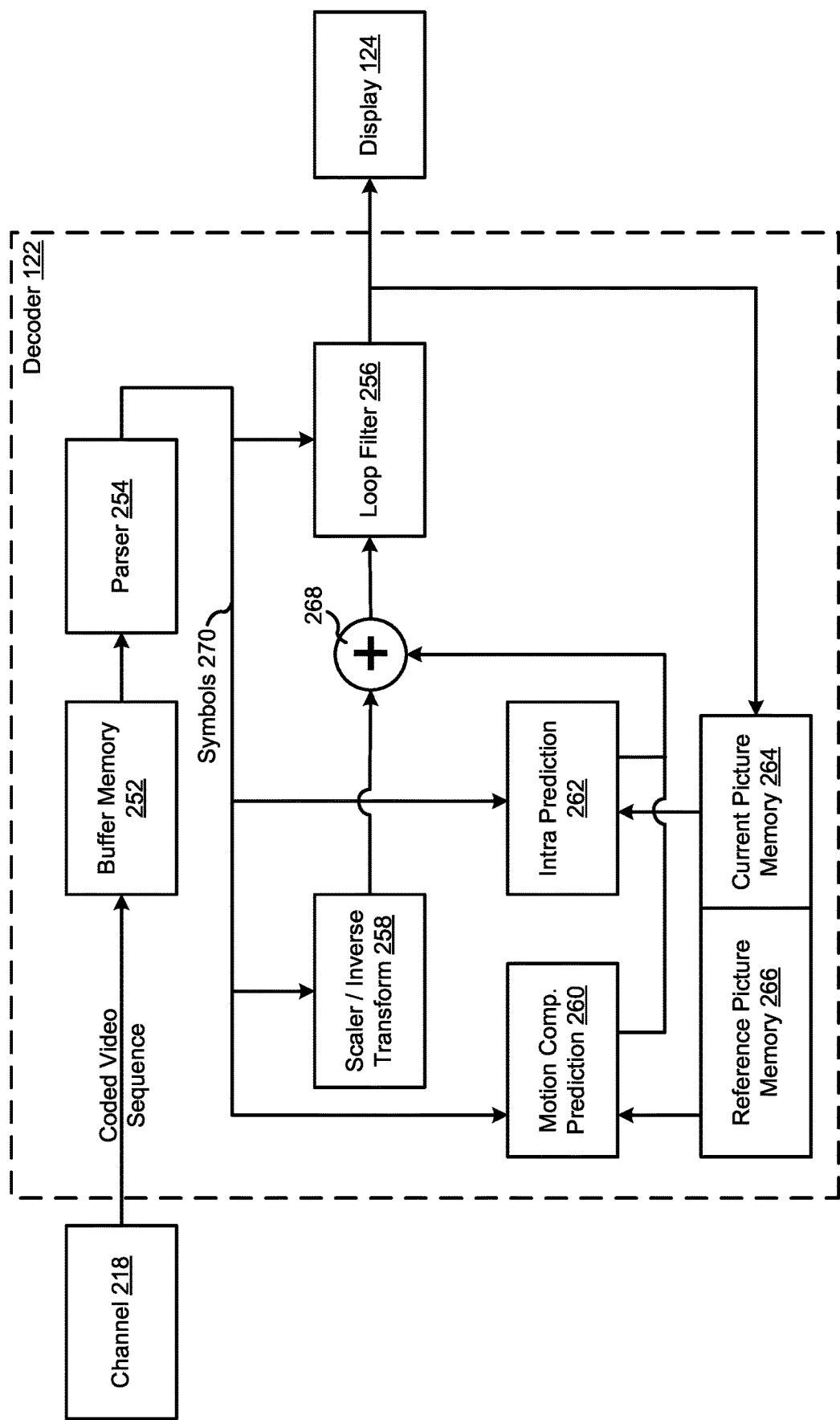

SYSTEMS AND METHODS FOR JOINT SIGNALING OF TRANSFORM COEFFICIENT SIGNS

CROSS-REFERENCE TO RELATED APPLICATION

This application claims priority to U.S. Provisional Patent Application No. 63/352,411, entitled "JOINT SIGNALING OF COEFFICIENT SIGNS USING MULTIPLE SYMBOL CODEC" filed Jun. 15, 2022, which is hereby incorporated by reference in its entirety.

TECHNICAL FIELD

The disclosed embodiments relate generally to video coding, including but not limited to systems and methods for coefficient sign prediction and encoding/decoding for transform coefficients.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and/or decoder can utilize techniques from several broad categories and steps, including, for example, motion compensation, Fourier transform, quantization, and entropy coding. During entropy coding, data about operations may be sent to an entropy encoder. The entropy encoder may output a bitstream (a coded video sequence), which may be transmitted to another device via a transmission channel. During video decoding process, a bitstream may be sent to an entropy decoder (parser). The entropy decoder may output, based on the bitstream, data about operations, which may include intra prediction information, residue information, and the like. In some embodiments, the entropy coding/decoding utilizes an arithmetic coding algorithm based on probability of occurrence of symbols (or characters) as basis for arithmetic coding. In some embodiments, the probability of occurrence of the symbols (or characters) is updated dynamically during the coding/decoding process. For example, there are only two possible characters ("a" and "b"), a probability of an "a" occurrence is denoted as $p\_a$, and a probability of a "b" occurrence is denoted as $p\_b$, and then $p\_a+p\_b=1$ (or any other constant value). Thus, when the "a" is encountered in the coding/decoding process, $p\_a$ may be updated to a larger value; and $p\_b$ may be updated to a smaller value because their summation may be constant. This probability updating process may be referred to as a "probability transition process" or a "probability state index updating process."

In accordance with some embodiments, a method of video encoding is provided. The method includes: (i) obtaining video data comprising a plurality of blocks, including a first block; (ii) determining a plurality of transform coefficients associated with the first block; (iii) predicting respective coefficient signs for the plurality of transform coefficients; and (iv) entropy coding the first block including jointly signaling two or more of the predicted coefficient signs.

In accordance with some embodiments, another method of video decoding is provided. The method includes: (i) obtaining video data comprising a plurality of blocks, including a first block, from a bitstream; (ii) determining a plurality of transform coefficients associated with the first block; (iii) obtaining an encoded value for a transform coefficient sign index; (iv) reconstructing, from the encoded value, respective coefficient signs for the plurality of transform coefficients; and (v) reconstructing the first block based on the plurality of transform coefficients and the reconstructed respective coefficient signs for the plurality of transform coefficients.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 2B is a block diagram illustrating example elements of a decoder component in accordance with some embodiments.

In accordance with common practice, the various features illustrated in the drawings are not necessarily drawn to scale, and like reference numerals can be used to denote like features throughout the specification and figures.

DETAILED DESCRIPTION

The present disclosure describes, among other things, predicting coefficient signs during coding of a transform block and jointly signaling the predicted coefficient signs. For example, respective coefficient signs are predicted for a plurality of transform coefficients and subsequent entropy coding includes jointly signaling two or more of the predicted coefficient signs. For example, a multi-symbol arithmetic coder may be used to jointly code two or more predicted coefficient signs (and/or jointly code the accuracy of predicted signs). Jointly signaling multiple coefficient signs improves coding efficiency, e.g., less encoding bits required, which reduces bandwidth requirements.

Example Systems and Devices

Figure 1:
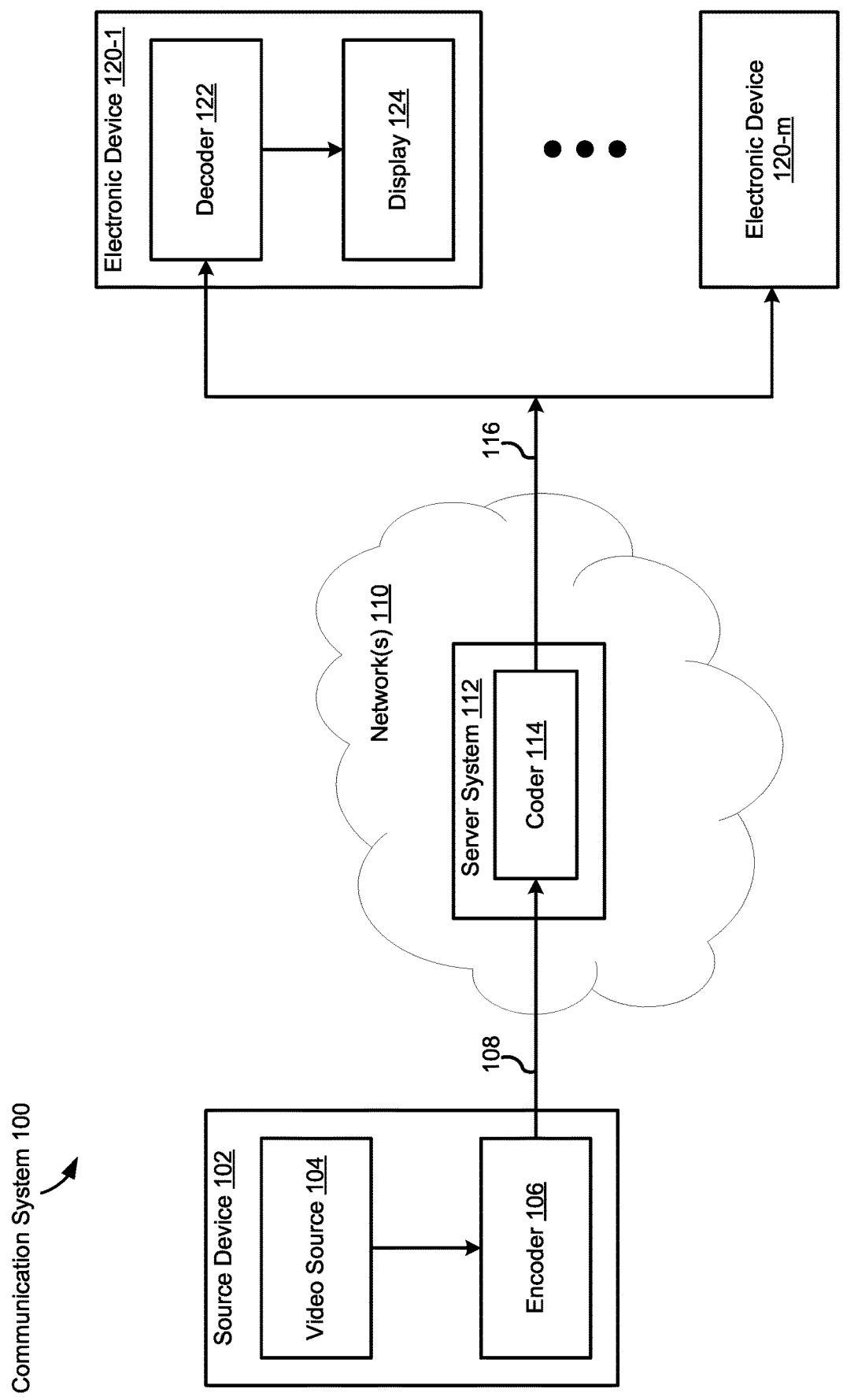
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
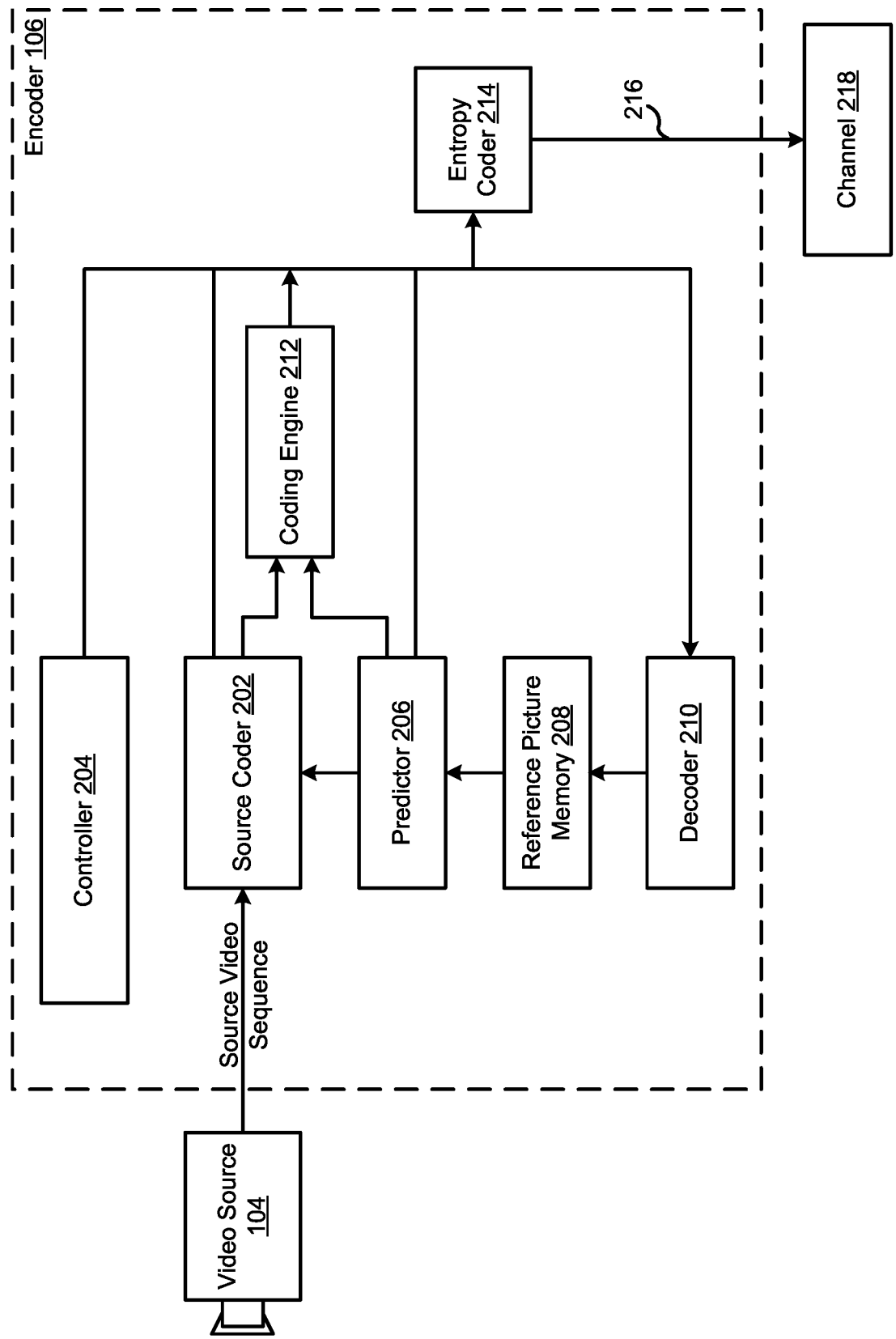
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter unit 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
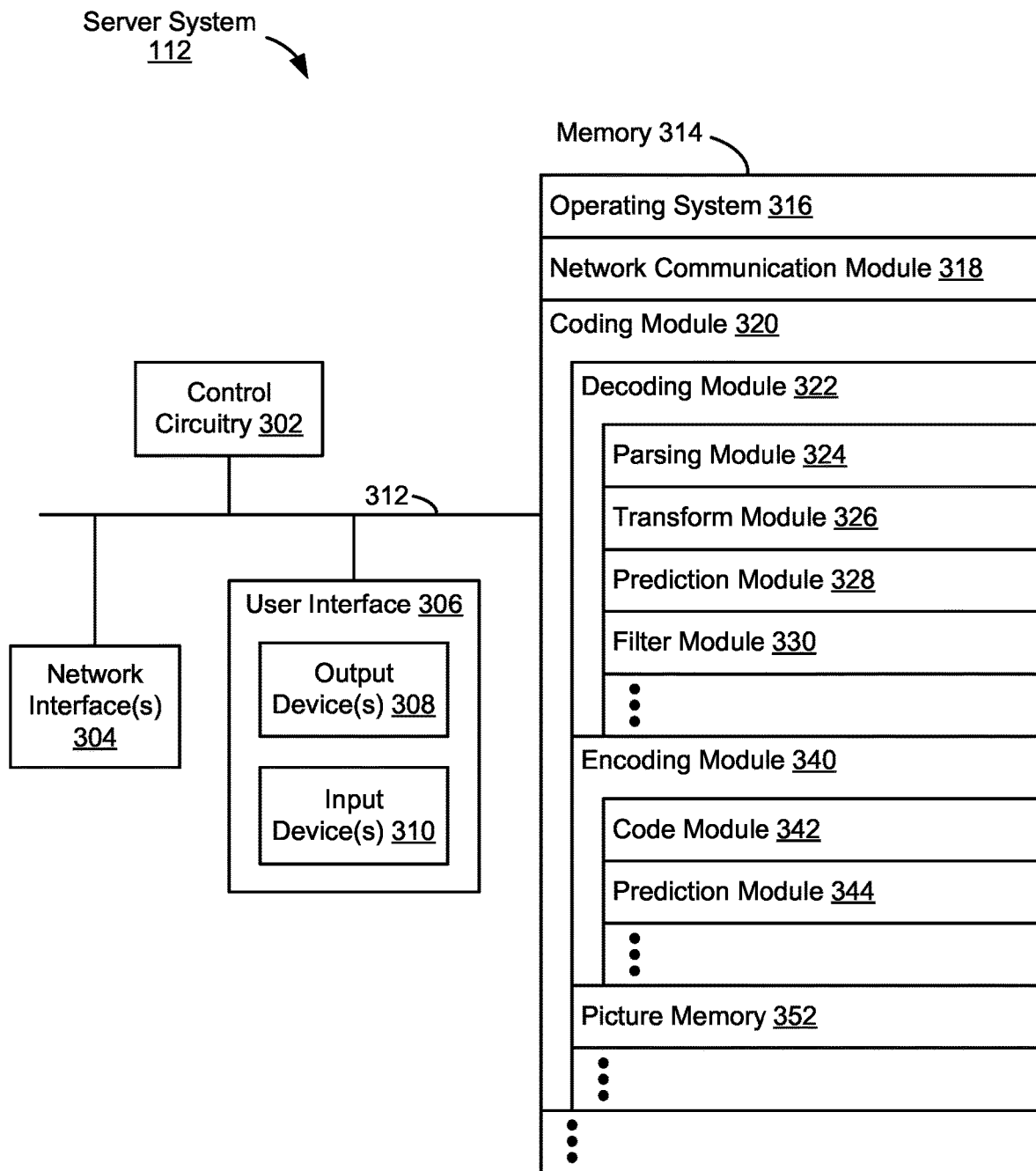
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter unit 256).

In some embodiments, the encoding module 340 includes a code module 342 (e.g., configured to perform the various functions described previously with respect to the source coder 202, the coding engine 212, and/or the entropy coder 214) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Approaches

Figure 4A:
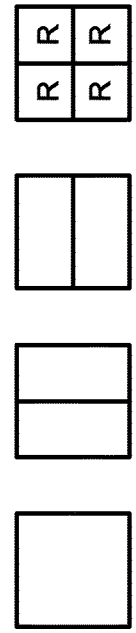
FIGS. 4A-4D illustrate example coding tree structures in accordance with some embodiments.

FIGS. 4A-4D illustrate example coding tree structures in accordance with some embodiments. As shown in a first coding tree structure (400) in FIG. 4A, some coding approaches (e.g., VP9) use a 4-way partition tree starting from a 64×64 level down to a 4×4 level, with some additional restrictions for blocks 8×8. In FIG. 4A, partitions designated as R can be referred to as recursive in that the same partition tree is repeated at a lower scale until the lowest 4×4 level is reached.

Figure 4B:
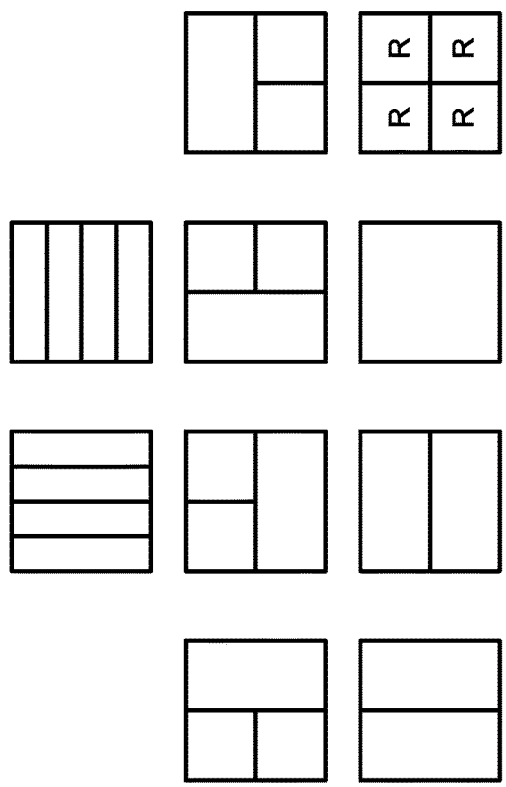
Figure 4C:
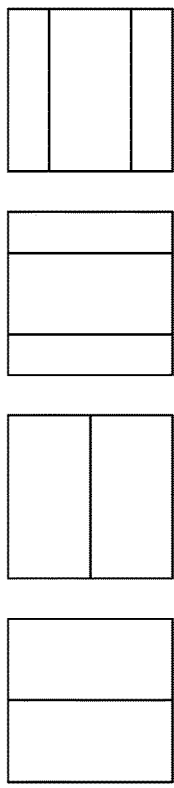

As shown in a second coding tree structure (402) in FIG. 4B, some coding approaches (e.g., AV1) expand the partition tree to a 10-way structure and increase the largest size (e.g., referred to as a superblock in VP9/AV1 parlance) to start from 128×128. The second coding tree structure includes 4:1/1:4 rectangular partitions that are not in the first coding tree structure. The partition types with 3 sub-partitions in the second row of FIG. 4B is referred to as a T-type partition. The rectangular partitions in this tree structure cannot be further subdivided. In addition to a coding block size, coding tree depth can be defined to indicate the splitting depth from the root note. For example, the coding tree depth for the root node, e.g., 128×128, is set to 0, and after a tree block is further split once, the coding tree depth is increased by 1.

As an example, instead of enforcing fixed transform unit sizes as in VP9, AV1 allows luma coding blocks to be partitioned into transform units of multiple sizes that can be represented by a recursive partition going down by up to 2 levels. To incorporate AV1's extended coding block partitions, square, 2:1/1:2, and 4:1/1:4 transform sizes from 4×4 to 64×64 are supported. For chroma blocks, only the largest possible transform units are allowed.

As an example, a CTU may be split into CUs by using a quad-tree structure denoted as a coding tree to adapt to various local characteristics, such as in HEVC. In some embodiments, the decision on whether to code a picture area using inter-picture (temporal) or intra-picture (spatial) prediction is made at the CU level. Each CU can be further split into one, two, or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into TUs according to another quad-tree structure like the coding tree for the CU. One of the key features of the HEVC structure is that it has multiple partition concepts including CU, PU, and TU. In HEVC, a CU or a TU can only be a square shape, while a PU may be a square or rectangular shape for an inter predicted block. In HEVC, one coding block may be further split into four square sub-blocks, and a transform is performed on each sub-block (TU). Each TU can be further split recursively (using quad-tree split) into smaller TUs, which is called Residual Quad-Tree (RQT). At a picture boundary, such as in HEVC, implicit quad-tree split may be employed so that a block will keep quad-tree splitting until the size fits the picture boundary.

Figure 4D:
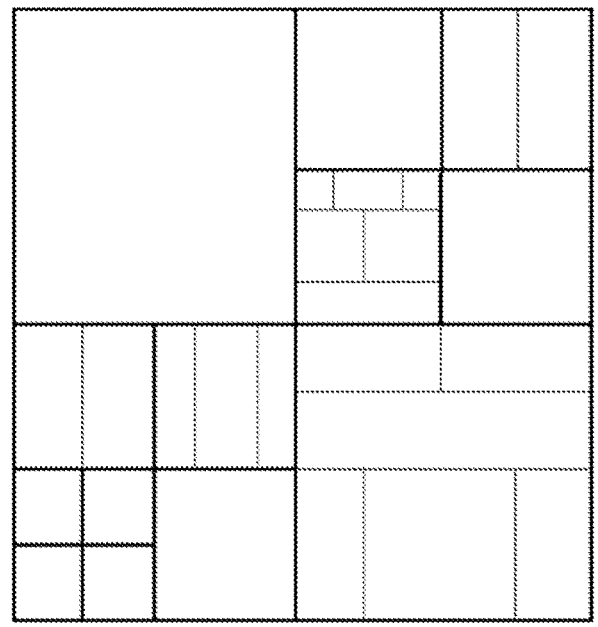

A quad-tree with nested multi-type tree using binary and ternary splits segmentation structure, such as in VVC, may replace the concepts of multiple partition unit types, e.g., it removes the separation of the CU, PU, and TU concepts except as needed for CUs that have a size too large for the maximum transform length, and supports more flexibility for CU partition shapes. In the coding tree structure, a CU can have either a square or rectangular shape. ACTU is first partitioned by a quaternary tree (also referred to as quad-tree) structure. The quaternary tree leaf nodes can be further partitioned by a multi-type tree structure. As shown in a third coding tree structure (404) in FIG. 4C, the multi-type tree structure includes four splitting types. For example, the multi-type tree structure includes vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called CUs, and unless the CU is too large for the maximum transform length, this segmentation is used for prediction and transform processing without any further partitioning. This means that, in most cases, the CU, PU, and TU have the same block size in the quad-tree with nested multi-type tree coding block structure. An exception occurs when a maximum supported transform length is smaller than the width or height of the color component of the CU. An example of block partitions for one CTU (406) is shown in FIG. 4D, which illustrates an example quadtree with nested multi-type tree coding block structure.

A maximum supported luma transform size may be 64×64 and the maximum supported chroma transform size may be 32×32, such as in VVC. When the width or height of the CB is larger than the maximum transform width or height, the CB is automatically split in the horizontal and/or vertical direction to meet the transform size restriction in that direction.

The coding tree scheme supports the ability for the luma and chroma to have a separate block tree structure, such as in VTM7. In some cases, for P and B slices, the luma and chroma CTBs in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three color components unless the video is monochrome.

In order to support the extended coding block partitions, multiple transform sizes (e.g., ranging from 4-point to 64-point for each dimension) and transform shapes (e.g., square or rectangular with width/height ratio's 2:1/1:2 and 4:1/1:4) may be utilized, such as in AV1.

A two-dimensional transform process may involve the use of hybrid transform kernels (e.g., composed of different one-dimensional transforms for each dimension of the coded residual block). Primary one-dimensional transforms may include at least one of a) 4-point, 8-point, 16-point, 32-point, 64-point discrete cosine transform DCT-2; b) 4-point, 8-point, 16-point asymmetric discrete sine transforms (DST-4, DST-7) and their flipped versions; or c) 4-point, 8-point, 16-point, 32-point identity transforms. The basis functions for the DCT-2 and asymmetric DSTs, such as used in AV1, are listed in Table 1.

TABLE 1

Example AV1 primary transform basis functions

| Transform Type | Basis function $T_i(j)$, i, j = 0, 1, ..., N−1 |
| --- | --- |
| DCT-2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |
| IDTX | $T_i(j) = (i == j)?\ 1:0$ |

The availability of hybrid transform kernels may be based on the transform block size and prediction mode. Example dependencies are listed in Table 2 below, where "→" and "↓" denote the horizontal and vertical dimensions, and "✓" and "x" denote the availability of a kernel for that block size and prediction mode. IDTX (or IDT) stands for identity transform.

TABLE 2

Availability of hybrid transform kernels based on prediction modes and block sizes

| | | Prediction mode | |
| --- | --- | --- | --- |
| Transform Types | Description | Intra | Inter |
| DCT_DCT | DCT ↓ and → | ✓ (all block sizes) | ✓ (all block sizes) |
| ADST_DCT | ADST ↓; DCT → | ✓ | ✓ |
| DCT_ADST | DCT ↓; ADST → | (block size ≤ 16 × 16) | (block size ≤ 16 × 16) |
| ADST_ADST | ADST ↓ and → | | |
| FLIPADST_DCT | FLIPADST ↓; DCT → | x | ✓ |
| DCT_FLIPADST | DCT ↓; FLIPADST → | | (block size ≤ 16 × 16) |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16 × 16) | ✓ (block size ≤ 32 × 32) |

TABLE 2-continued

Availability of hybrid transform kernels
based on prediction modes and block sizes

| Transform Types | Description | Prediction mode | |
|---|---|---|---|
| | | Intra | Inter |
| V_DCT | DCT ↓; IDTX → | ✓ | ✓ |
| H_DCT | IDTX ↓; DCT → | (block size < 16 × 16) | (block size ≤ 16 × 16) |
| V_ADST | ADST ↓; IDTX → | ✗ | ✓ (block size < 16 × 16) |
| H_ADST | IDTX ↓; ADST → | | |
| V_FLIPADST | FLIPADST ↓; IDTX → | ✗ | ✓ |
| H_FLIPADST | IDTX ↓; FLIPADST → | | (block size < 16 × 16) |

For a chroma component, the transform type selection is performed in an implicit way. For intra prediction residuals, the transform type is selected according to the intra prediction mode, as specified in Table 3 for example. For inter prediction residuals, the transform type may be selected according to the transform type selection of the co-located luma block. Therefore, for chroma component, no transform type signaling in the bitstream is needed.

TABLE 3

Transform type selection for chroma
component intra prediction residuals

| Intra prediction | Vertical Transform | Horizontal Transform |
|---|---|---|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

Line graph transforms (LGTs) have been introduced with the view of replacing and extending (by introducing 32-point, 64-point) the one-dimensional DSTs described above.

Figures 5A, 5B:
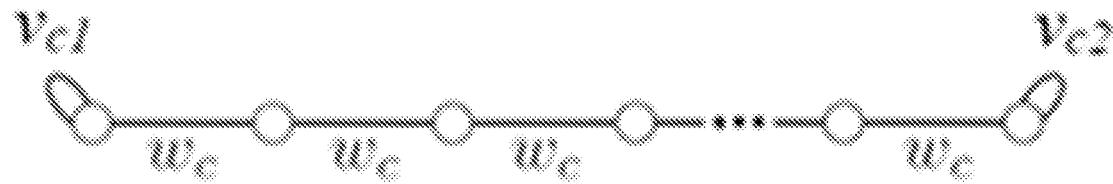
FIG. 5A shows an example line graph transform (LGF) in accordance with some embodiments.
FIG. 5B shows example pixel positions in a transform block and adjacent rows and columns in accordance with some embodiments.

Graphs are generic mathematical structures including, or consisting of, sets of vertices and edges, which are used for modelling affinity relations between the objects of interest. Weighted graphs (for which a set of weights are assigned to edges and potentially to vertices) provide sparse representations for robust modeling of signals/data. LGTs can improve coding efficiency by providing a better adaptation for diverse block statistics. Separable LGTs are designed and optimized by learning line graphs from data to model underlying row and column-wise statistics of blocks in residual signals, where the associated generalized graph Laplacian (GGL) matrices are used to derive LGTs. FIG. 5A shows an example LGT characterized by self-loop weights $v_{c1}$, $v_{c2}$, and edge weights $w_c$.

Given a weighted graph G (W, V) the GGL matrix may be defined as:

$$L_c = D - W + V \quad \text{Equation 1}$$

where W is the adjacency matrix including, or consisting of, non-negative edge weights $w_c$, D is the diagonal degree matrix, and V is the diagonal matrix denoting weighted self-loops $v_{c1}$, $v_{c2}$. The matrix $L_c$ can be represented as:

$$L_c = \begin{bmatrix} \omega_c + v_{c1} - \omega_c & & & & 0 \\ -\omega_c & 2\omega_c & -\omega_c & & \\ & \ddots & \ddots & \ddots & \\ & & -\omega_c & 2\omega_c & -\omega_c \\ 0 & & & -\omega_c & \omega_c + v_{c2} \end{bmatrix} \text{ for } \omega_c > 0 \quad \text{Equation 2}$$

The LGTs can then be derived by the eigen-decomposition of the GGL $L_c = U\Phi DU^T$, where columns of orthogonal matrix U are the basis vectors of the LGT and (D is the diagonal eigenvalue matrix. DCTs and DSTs, including DCT-2, DCT-8 and DST-7, are LGTs derived from certain forms of GGLs. For example, DCT-2 may be derived by setting $v_{c1}=0$, DST-7 may be derived by setting $v_{c1}=w_c$, DCT-8 may be derived by setting $v_{c2}=w_c$, DST-4 may be derived by setting $v_{c1}=2w_c$, and DCT-4 may be derived by setting $v_{c2}=2w_c$.

The LGTs can be implemented as matrix multiplications. The 4p LGT core may be derived by setting $v_{c1}=2w_c$, in $L_c$, which means that it is a DST-4. The 8p LGT core may be derived by setting $v_{c1}=1.5w_c$ in $L_c$. The 16p, 32p, and 64p LGT core may be derived by setting $v_{c1}=w_c$ in $L_c$, which means that it is a DST-7.

In an example of residual coding in AV1, for each transform unit, coefficient coding starts with signaling a skip sign, and followed by the transform kernel type and the end-of-block (eob) position when the skip sign is zero. Then, each coefficient value is mapped to multiple level maps and the sign. After the eob position is coded, the lower-level map and the middle-level map can be coded in reverse scan order, the former indicating if the coefficient magnitude is between 0 and 2 while the latter indicates if the range is between 3 and 14. The next step codes, in the forward-scanning order, the sign of the coefficient as well as the residual value of the coefficient larger than 14 by Exp-Golomb code.

As for the use of context modeling, the lower-level map coding incorporates the transform size and directions as well as up to five neighboring coefficient information. On the other hand, the middle-level map coding follows a similar approach as with the lower-level map coding except that the number of neighboring coefficients is down to two. The Exp-Golomb code for the residual level as well as the sign of AC coefficient are coded without any context model, while the sign of DC coefficient is coded using its neighbor transform-unit's DC sign.

A weighted average of above and left neighboring blocks DC sign value may be used for deriving the context information, e.g., as described in equation 1 below.

Weighted Average of Sign Values $$dc\_sum = \sum_{i \in neighbors} dc\_sign(i) * overlap(i, curr\_block) \quad \text{Equation 3}$$

Coding Contexts $$dc\_ctx = 0 \text{ if } dc\_sum = 0, \quad \text{Equation 4}$$
$$= 1 \text{ if } dc\_sum < 0,$$
$$= 2 \text{ if } dc\_sum > 0$$

In this example, the weighting depends on the length of the neighboring transform block's intersection with the current transform block. The derived context information is used as an index to access three different contexts for DC sign coding, e.g., as described in equation 2 above. Sign values of other coefficients may be coded directly without using context model.

In an example of residual coding for transform skip, such as in VVC, a CU coded in transform skip mode (TSM) may use a modified transform coding process. The modifications can be summarized as follows: (a) all the subblocks and positions within a subblock are scanned in the forward scanning order; (b) the last significant coefficient position is not signaled; (c) syntax element coded_sub_block_flag is not coded for the last subblock; (d) changes are made to context modelling for syntaxes sig_coeff flag, abs_level_gt1 and par_level_flag; and (e) sign flag is context coded based on left and above neighboring values.

During development of AV2, a new mode named Forward Skip Coding (FSC) was introduced to modify the transform coding process for IDTX (two-dimensional transform skip). The modifications introduced by FSC, which are similar in functionality to the above-mentioned changes introduced to VVC transform skip mode, can be summarized as follows: (a) all the coded blocks and positions within the coded block are scanned in the forward scanning order; (b) EOB syntax is skipped; (c) reduced contexts are used for coefficient levels; and (d) sign flag is context coded based on left, bottom, and bottom left.

For intra blocks, when FSC mode is chosen, the transform type is not signaled for the transform blocks. Rather, the transform type signaling is bundled with the FSC mode at a coded block level. Inter blocks do not signal FSC mode, but if the transform type is IDTX and screen content flag is enabled, the FSC method is implicitly chosen.

For entropy coding of transform coefficients, coefficient signs may be coded separately from the magnitude/level (absolute value of the coefficient value) using bypass mode. The separate coding means that each coefficient sign may cost one bit to code, which is costly. To improve the entropy coding efficiency of coefficient signs, sign prediction techniques may be used. For example, instead of signaling the sign values, a flag indicating whether the predicted sign is the same as an actual sign may be entropy coded using context. The context value may depend on the level (absolute value of coefficient value) of the coefficient since a larger level value leads to more accurate predicted sign values.

In an example, a group of transform coefficients are identified where the associated signs need to be predicted. Then a set of hypotheses for the predicted sign values of these coefficients are generated. For example, for three coefficients, the number of hypotheses can be up to 8 (2^3). To predict the sign values, there is a cost value associated with each hypothesis, and the hypothesis with minimum cost is used to specify the predicted sign values for the coefficients covered by the hypothesis.

FIG. 5B shows an example of pixel positions in a transform block 500 as well as adjacent rows 502 and adjacent columns 504. In some embodiments, the cost for each hypothesis is calculated as follows. A reconstruction block associated with a given hypothesis (hypothesis reconstruction) is generated following the reconstruction process (e.g., dequantization, inverse transform), and the boundary samples of the reconstructed block, e.g., $p_{0,y}$ and $p_{x,0}$, are derived. For each reconstructed pixel $p_{0,y}$ at the left boundary of the reconstructed block, a simple linear prediction using the two previously-reconstructed neighbor pixels to the left is performed to get its prediction $pred_{0,y}=(2p_{-1,y}-p_{-2,y})$. The absolute difference between this prediction and the reconstructed pixel $p_{0,y}$ is added to the cost of the hypothesis. Similar processing occurs for pixels in the top row of the reconstructed block, summing the absolute differences of each prediction $pred_{x,0}=(2p_{x,-1}-p_{x,-2})$ and the reconstructed pixel $p_{x,0}$. Accordingly, the calculation of the cost for each coefficient sign prediction hypothesis is given in Equation 5 below.

Prediction Cost $$cost = \sum_{x=0}^{w-1}|(2p_{x,\_1} - p_{x,\_2}) - p_{x,0}| + \sum_{y=0}^{h-1}|(2p_{\_1,y} - p_{\_2,y}) - p_{0,y}| \quad \text{Equation 5}$$

Coefficient signs may be signaled jointly using multiple symbols for improved coding efficiency. Methods for efficient coding of DC and/or AC coefficient signs may involve predicting/estimating the DC and/or AC coefficient signs followed by context coding the accuracy ($Â_i$) of prediction/ estimation, where i is the $i^{th}$ coefficient in a scan order and i≤N and N is the maximum number of coefficients to be predicted/estimated. The $Â_i$ can be defined by a binary value (0 or 1), where 0 denotes that the prediction/estimation is accurate, while 1 denotes the opposite. The coding efficiency can be further improved by grouping together the various $Â_i$s and utilizing the power of a multi-symbol arithmetic coder to jointly code them. Methods to jointly code the $Â_i$s and/or predicted coefficient signs are discussed in the forthcoming sections.

Figure 6A:
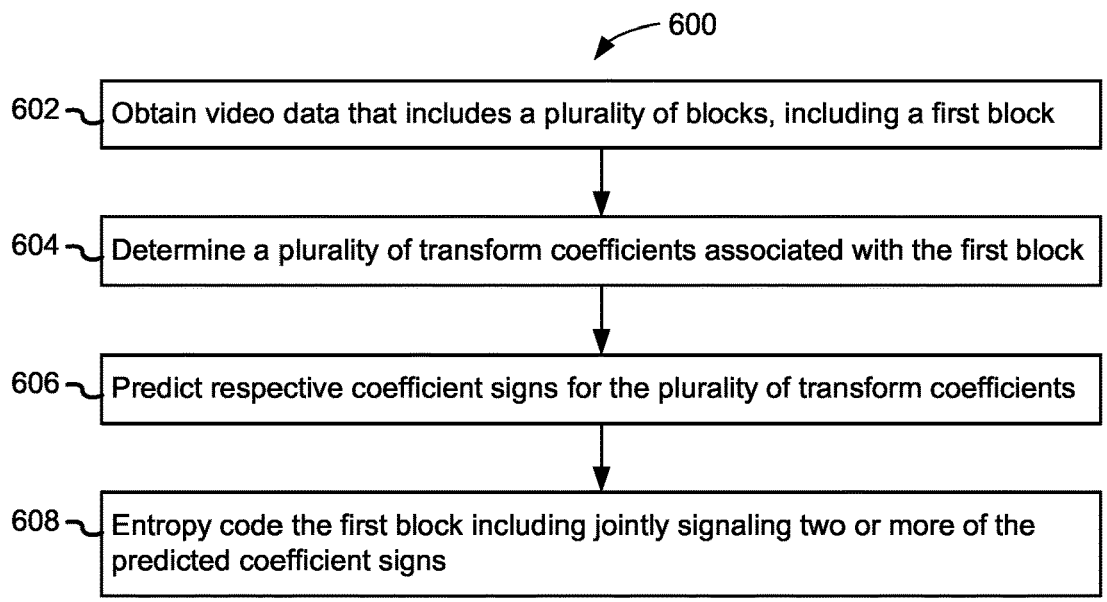
FIG. 6A is a flow diagram illustrating an example method of encoding video in accordance with some embodiments.

FIG. 6A is a flow diagram illustrating a method 600 of encoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system obtains (602) video data that includes a plurality of blocks, including a first block. The system determines (604) a plurality of transform coefficients associated with the first block. In some embodiments, the plurality of transform coefficients are associated with respective prediction accuracies of a plurality of prediction accuracies. The system predicts (606) respective coefficient signs for the plurality of transform coefficients. In some embodiments, the method includes jointly signaling two or more of the predicted coefficient signs by grouping the two or more of the predicted coefficient signs based on the plurality of prediction accuracies. The system entropy codes (608) the first block including jointly signaling two or more of the predicted coefficient signs. In some embodiments, the first block is entropy coded using the jointly signaled coefficient signs. The method 600 is optionally applied to luma and/or chroma blocks. In the present disclosure, the term "block" may be used to refer to coefficients in a transform block.

In some embodiments, multiple transform coefficient signs are signaled jointly, e.g., instead of signaling each sign separately. In some embodiments, when encoding multiple transform coefficient signs, the encoder component groups selected N individual coefficient signs together to form an index that is associated with $2^N$ symbols, with each symbol representing a specific combination of the N coefficient sign values. In some embodiments, the index is coded and decoded using a multi-symbol arithmetic coder. In some embodiments, instead of grouping and coding transform coefficient sign bits, the values indicating whether predicted signs are same with actual signs are grouped and coded as one index. In some embodiments, the index is context coded. In some embodiments, the context to code the index is derived from already coded information such as plane type, transform type, and/or block size.

In some embodiments, only selected N coefficient signs are grouped together to form an index and the remaining coefficient signs are signaled separately. In an example, if the number of non-zero coefficients in a transform block, denoted as M, is less than N, N-M values in the set of $2^N$ symbols are assigned to zero while mapping to an index. In another example, if the number of non-zero coefficients in a transform block, denoted as M, is less than N, N-M coefficient signs in a transform block are mapped to an index. In another example, if the number of non-zero coefficients in a transform block is greater than N, selected N transform coefficient signs are mapped to an index while remaining coefficient signs are coded separately.

In some embodiments, transform coefficient signs (e.g., all the transform coefficient signs) are divided into groups of N signs and each group of coefficient signs is mapped to an index. In an example, if the number of non-zero coefficients in a transform block is 14 and N=3, sets of 3 transform coefficient signs among the first 12 coefficient signs are mapped to an index each. The remaining two transform coefficient signs in this example are mapped to an index that is associated with $2^2$=4 symbols. In another example, if the number of non-zero coefficients in a transform block is 14 and N=3, sets of 3 transform coefficient signs among the first 12 coefficient signs are mapped to an index each. The remaining two transform coefficient signs in this example are mapped to an index in the set [0, $2^N$-1] such that the last coefficient sign is assumed to be zero.

In another example, at an encoder component, if N=3, the $\hat{A}_i$s can take any value in the set [000, 001, 010, 011, 100, 101, 110, 111]. In this example, the combinations of $\hat{A}_i$s are mapped to a unique index in the set [0, 1, 2, 3, 4, 5, 6, 7]. In some embodiments, predicted signs are grouped and coded in a similar manner as described above with respect to $\hat{A}_i$s.

Figure 6B:
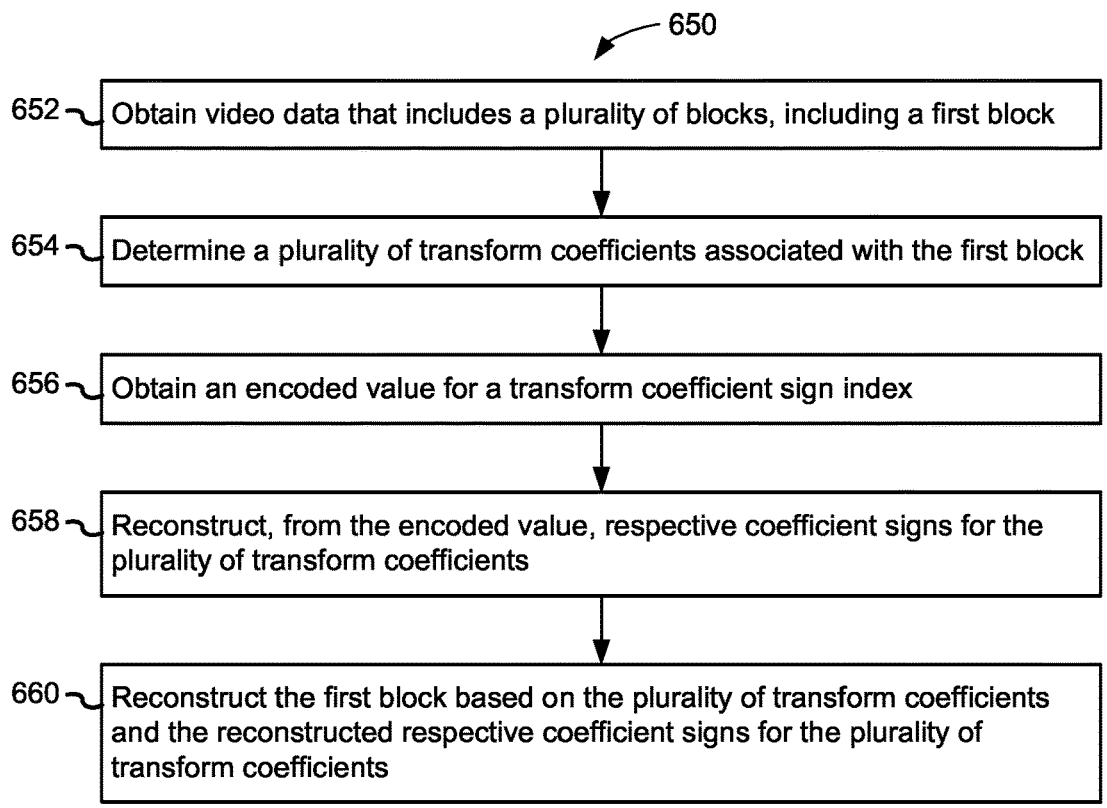
FIG. 6B is a flow diagram illustrating an example method of decoding video in accordance with some embodiments.

FIG. 6B is a flow diagram illustrating a method 650 of decoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system obtains (652) video data that includes a plurality of blocks, including a first block. The system determines (654) a plurality of transform coefficients associated with the first block. The system obtains (566) an encoded value for a transform coefficient sign index. The system reconstructs (658), from the encoded value, respective coefficient signs for the plurality of transform coefficients. The system reconstructs (660) the first block based on the plurality of transform coefficients and the reconstructed respective coefficient signs for the plurality of transform coefficients. The method 650 is optionally applied to luma and/or chroma blocks. In some embodiments, at a decoder component, the coefficient signs of the selected N individual coefficients are reconstructed using the decoded value of the index. In some embodiments, the index is coded and decoded using a multi-symbol arithmetic coder.

In some embodiments, each combination of multiple transform coefficient signs is mapped to a pre-defined index value. In some embodiments, the index can take any value in the set [0, $2^N$–1], e.g., the source space of index.

In an example, at the decoder component, if N=3, the index can take any value in the set [0, 1, 2, 3, 4, 5, 6, 7]. In this example, the index is mapped to a unique grouping of $\hat{A}_i$s in the set [000, 001, 010, 011, 100, 101, 110, 111]. In some embodiments, predicted signs are grouped and coded in a similar manner as described above with respect to $\hat{A}_i$s.

Although FIGS. 6A and 6B illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that various stages could be implemented in hardware, firmware, software, or any combination thereof.

Turning now to some example embodiments.

(A1) In one aspect, some embodiments include a method (e.g., the method 600) of video encoding. In some embodiments, the method is performed at a computing system (e.g., the server system 112) having memory and control circuitry. In some embodiments, the method is performed at a coding module (e.g., the coding module 320). In some embodiments, the method is performed at an entropy coder (e.g., the entropy coder 214). The method includes: (i) obtaining video data comprising a plurality of blocks (e.g., from the video source 104), including a first block; (ii) determining a plurality of transform coefficients associated with the first block; (iii) predicting respective coefficient signs for the plurality of transform coefficients (e.g., using the prediction module 344); and (iv) entropy coding the first block (e.g., using the encoding module 340) including jointly signaling two or more of the predicted coefficient signs. In some embodiments, the plurality of transform coefficients are associated with respective prediction accuracies of a plurality of prediction accuracies. In some embodiments, the method includes jointly signaling two or more of the predicted coefficient signs by grouping the two or more of the predicted coefficient signs based on the plurality of prediction accuracies. In some embodiments, the first block is entropy coded using the jointly signaled coefficient signs. For example, the plurality of blocks are transform blocks. In some embodiments, the first block comprises a luma block. In some embodiments, the first block comprises a chroma block. In some embodiments, each element of the first block corresponds to a reconstructed pixel.

(A2) In some embodiments of A1, jointly signaling the two or more predicted coefficient signs includes jointly encoding the two or more predicted coefficient sign. For example, if the two or more predicted coefficient signs equal 3, the predicted signs can take any value in the set [000, 001, 010, 011, 100, 101, 110, 111]. In this example, the combinations of predicted signs are mapped to a unique index in the set [0, 1, 2, 3, 4, 5, 6, 7].

(A3) In some embodiments of A1, jointly signaling the two or more predicted coefficient signs comprises jointly encoding two or more values, each value of the two or more values indicating whether a respective predicted coefficient sign matches an actual sign of the corresponding transform coefficient. For example, the values are accuracy ($\hat{A}_i$s) values of the prediction coefficient signs.

(A4) In some embodiments of A3, encoding the two or more values includes: (i) mapping a combination of the two or more values to a predefined index value of an index of symbols; and (ii) encoding the predefined index value. For example, if the two or more predicted coefficient signs equal 3, the $\hat{A}_i$s can take any value in the set [000, 001, 010, 011, 100, 101, 110, 111]. In this example, the combinations of $\hat{A}_i$s are mapped to a unique index in the set [0, 1, 2, 3, 4, 5, 6, 7].

(A5) In some embodiments of any of A1-A4: (i) the method further includes obtaining an index of symbols; (ii) each symbol of the index of symbols represents a respective combination of coefficient sign values; and (iii) the index of symbols is used to jointly signal the two or more predicted coefficient signs. For example, the encoder groups N individual coefficient signs to form an index that is associated with $2^N$ symbols, with each symbol representing a specific combination of the N coefficient sign values.

(A6) In some embodiments of A5, the method further includes encoding the index of symbols using a multi-symbol arithmetic coder. In some embodiments, the method further includes encoding the index of symbols using a binary coder.

(A7) In some embodiments of A5 or A6, jointly signaling the two or more predicted coefficient signs includes: (i) mapping a combination of the two or more predicted coefficient signs to a predefined index value of the index of symbols; and (ii) encoding the predefined index value.

(A8) In some embodiments of any of A5-A7, the index of symbols includes values in a range of zero to $2^N-1$, where N is a number of the predicted coefficient signs being jointly signaled.

(A9) In some embodiments of any of A5-A8, the method further includes context coding the index of symbols.

(A10) In some embodiments of A9, the index of symbols is context coded based on already-coded information. For example, the already-coded information includes plane type, transform type, and/or block size.

(A11) In some embodiments of any of A1-A10: (i) the predicted coefficient signs include N+M predicted coefficient signs; (ii) jointly signaling the two or more predicted coefficient signs includes jointly signaling N predicted coefficient signs; and (iii) the method further includes individually signaling M predicted coefficient signs.

(A12) In some embodiments of A11, the N predicted coefficient signs correspond to transform coefficients having non-zero respective values.

(A13) In some embodiments of A11 or A12, the M predicted coefficient signs correspond to transform coefficients having respective values of zero.

(A14) In some embodiments of any of A11-A13, jointly signaling the N predicted coefficient signs includes mapping a combination of the N predicted coefficient signs to an index.

(A15) In some embodiments of any of A11-A14, jointly signaling the N predicted coefficient signs includes mapping a combination of values to an index, where each value of the combination of values indicates whether a respective predicted coefficient sign matches an actual sign of the corresponding transform coefficient.

(A16) In some embodiments of any of A1-A15: (i) the predicted coefficient signs include a set of predicted coefficient signs; (ii) jointly signaling the two or more of the predicted coefficient signs includes jointly signaling a first subset of the set of predicted coefficient signs; and (iii) the method further includes jointly signaling a second subset of the set of predicted coefficient signs. For example, transform coefficient signs are divided into groups of N signs and each group of coefficient signs is mapped to an index. In some embodiments, the set of predicted coefficient signs correspond to a set of non-zero transform coefficients.

(A17) In some embodiments of A16, a size of the first subset is different than a size of the second subset. For example, the first subset includes 3 predicted coefficient signs and the second subset includes 2 predicted coefficient signs. In another example, if the number of non-zero coefficients in a transform block is 14 and N=3, sets of 3 transform coefficient signs among the first 12 coefficient signs are mapped to an index each. The remaining two transform coefficient signs in this example are mapped to an index in the set $[0, 2^N-1]$ such that the last coefficient sign is assumed to be zero.

(A18) In some embodiments of any of A1-A17, the method further includes transmitting a bitstream that includes the entropy encoded first block.

(B1) In another aspect, some embodiments include a method of video decoding (e.g., the method 650). In some embodiments, the method is performed at a computing system (e.g., the server system 112) having memory and control circuitry. In some embodiments, the method is performed at a coding module (e.g., the coding module 320). In some embodiments, the method is performed at a parser (e.g., the parser 254). The method includes: (i) obtaining video data comprising a plurality of blocks, including a first block, from a bitstream (e.g., the bitstream transmitted in A18); (ii) determining a plurality of transform coefficients associated with the first block (e.g., using the parsing module 324); (iii) obtaining an encoded value for a transform coefficient sign index; (iv) reconstructing, from the encoded value, respective coefficient signs for the plurality of transform coefficients; and (v) reconstructing the first block (e.g., using the decoding module 322) based on the plurality of transform coefficients and the reconstructed respective coefficient signs for the plurality of transform coefficients.

(B2) In some embodiments of B1, reconstructing, from the encoded value, the respective coefficient signs for the plurality of transform coefficients includes: (i) decoding the encoded value; and (ii) mapping, using an index of symbols (e.g., the index described above with respect to A5), the decoded value to the respective coefficient signs for the plurality of transform coefficients.

(B3) In some embodiments of B1 or B2, the encoded value corresponds to a two or more predicted coefficient signs.

(B4) In some embodiments of B1 or B2, the encoded value corresponds to two or more values, each value of the two or more values indicating whether a respective predicted coefficient sign matches an actual sign of the corresponding transform coefficient.

(B5) In some embodiments of any of B1-B4: (i) the bitstream corresponds to video encoded in accordance with any of A1-A18; and (ii) reconstructing the respective coefficient signs includes reversing at least a portion of the encoding of any of A1-A18.

The methods described herein may be used separately or combined in any order. Each of the methods may be implemented by processing circuitry (e.g., one or more processors or one or more integrated circuits). In some embodiments, the processing circuitry executes a program that is stored in a non-transitory computer-readable medium.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A18 and B1-B5 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A18 and B1-B5 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video encoding performed at a computing system having memory and one or more processors, the method comprising:
    obtaining video data comprising a plurality of blocks, including a first block;
    determining a plurality of transform coefficients associated with the first block, wherein the plurality of transform coefficients are associated with respective prediction accuracies of a plurality of prediction accuracies;
    predicting respective coefficient signs for the plurality of transform coefficients;
    signaling an index value representing two or more of the predicted coefficient signs; and
    entropy coding the first block using the predicted coefficient signs.

2. The method of claim 1, wherein:
    the index value corresponds to an index of symbols; and
    each symbol of the index of symbols represents a respective combination of coefficient sign values.

3. The method of claim 1, further comprising encoding the index value using a multi-symbol arithmetic coder.

4. The method of claim 2, further comprising:
    mapping a combination of the two or more predicted coefficient signs to the index value of the index of symbols; and
    encoding the index value.

5. The method of claim 2, wherein the index of symbols comprises values in a range of zero to $2^N-1$, where N is a number of the predicted coefficient signs being jointly signaled.

6. The method of claim 2, wherein the index of symbols is context coded based on already-coded information.

7. The method of claim 1, wherein signaling the index value representing the two or more predicted coefficient signs comprises jointly encoding two or more values, each value of the two or more values indicating whether a respective predicted coefficient sign matches an actual sign of the corresponding transform coefficient.

8. The method of claim 7, wherein encoding the two or more values comprises:
    mapping a combination of the two or more values to the index value of an index of symbols; and
    encoding the index value.

9. The method of claim 1, wherein the predicted coefficient signs comprise N+M predicted coefficient signs;
    wherein the two or more predicted coefficient signs comprise N predicted coefficient signs; and
    the method further comprises individually signaling M predicted coefficient signs.

10. The method of claim 9, wherein the N predicted coefficient signs correspond to transform coefficients having non-zero respective values.

11. The method of claim 9, further comprising mapping a combination of the N predicted coefficient signs to the index value.

12. The method of claim 9, further comprising mapping a combination of values to the index value, wherein each value of the combination of values indicates whether a respective predicted coefficient sign matches an actual sign of the corresponding transform coefficient.

13. The method of claim 1, wherein:
the predicted coefficient signs comprise a set of predicted coefficient signs;
the index value represents a first subset of the set of predicted coefficient signs; and
the method further comprises jointly signaling a second subset of the set of predicted coefficient signs.

14. A method of video decoding performed at a computing system having memory and one or more processors, the method comprising:
obtaining a video bitstream comprising a plurality of blocks, including a first block;
obtaining a plurality of transform coefficients associated with the first block, wherein the plurality of transform coefficients are associated with respective prediction accuracies of a plurality of prediction accuracies;
parsing, from the video bitstream, an index value representing two or more predicted coefficient signs;
determining the two or more predicted coefficient signs using the index value; and
decoding the first block using the two or more predicted coefficient signs.

15. The method of claim 14, wherein the index value corresponds to an index of symbols, wherein each symbol of the index of symbols represents a respective combination of coefficient sign values.

16. The method of claim 14, further comprising entropy decoding the index value using a first context.

17. The method of claim 16, wherein the first context is based on one or more of: a plane type corresponding to the first block, a transform type corresponding to the first block, and a block size of the first block.

18. The method of claim 14, wherein determining the two or more predicted coefficient signs using the index value comprises mapping the index value to a combination of the two or more predicted coefficient signs.

19. A method of visual media processing, comprising:
obtaining a source video sequence that comprises a plurality of frames; and
performing a conversion between the source video sequence and a video bitstream of visual media data according to a format rule,
wherein the video bitstream comprises:
a set of encoded blocks including a first block, and
an indicator representing two or more predicted coefficient signs for the first block; and
wherein the format rule specifies that:
an index value is to be obtained from the indicator,
the two or more predicted coefficient signs are to be determined using the index value, and
the first block is to be decoded using the two or more predicted coefficient signs.

20. The method of claim 19, wherein the indicator is entropy encoded using a first context.

* * * * *